United States Patent [19]

Dobson

[11] 3,819,146
[45] June 25, 1974

[54] VALVE ASSEMBLY
[75] Inventor: John W. Dobson, Burbank, Calif.
[73] Assignee: International Telephone and Telegraph Corporation, New York, N.Y.
[22] Filed: Sept. 5, 1972
[21] Appl. No.: 286,165

[52] U.S. Cl. ................ 251/11, 236/68 R, 236/101
[51] Int. Cl. ........................ F16k 31/02, F03g 7/06
[58] Field of Search ............ 251/11; 236/68 R, 101

[56] References Cited
UNITED STATES PATENTS
| | | | |
|---|---|---|---|
| 2,583,795 | 1/1952 | Pawelsky et al. | 251/11 |
| 2,743,574 | 5/1956 | McCorkle | 251/11 |
| 2,821,837 | 2/1958 | McCorkle, Jr. | 251/11 |
| 3,442,483 | 5/1969 | Schwartz | 251/11 |
| 3,556,462 | 1/1972 | Randolph | 251/11 |

Primary Examiner—Arnold Rosenthal
Attorney, Agent, or Firm—A. Donald Stolzy

[57] ABSTRACT

A heat motor operated valve assembly that has a housing, a valve seat, a lever, and a bimetal operator. The lever is loosely hinged to the housing. The valve has a lost motion connection with the lever. The bimetal has a loose connection with the lever. The valve does not wear and provides a good seal with its seat over an extremely wide range of ambient temperatures. Prior heat motor actuated valves wore badly and did not seal at low and high ambient temperatures.

1 Claim, 7 Drawing Figures

PATENTED JUN 25 1974 3,819,146

VALVE ASSEMBLY

BACKGROUND OF THE INVENTION

This invention relates to fluid flow control devices, and more particularly to heat motor-operated valves.

In the past, it has been the practice to fix a valve rigidly with the bimetal of a heat motor. For modest changes in ambient temperature such valves have been found to be fairly satisfactory. However, for very low or very high ambient temperatures, these prior art valves fail to seal. Moreover, large changes in ambient temperature cause these prior art valves to move on their seats and to wear at an intolerable rate.

SUMMARY OF THE INVENTION

In accordance with the device of the present invention, the abovedescribed and other disadvantages of the prior art are overcome by hinging a heat motor actuated valve from the valve housing by an added auxiliary lever.

It is believed that there are several possible reasons why the hinge arrangement overcomes the wear and leakage problems of the prior art. For example, the hinge arrangement may guide the valve somewhat independently of the bimetal movement. Further, the lever may be loosely hinged allowing further freedom. The same is true of the bimetal-to-lever connection. At least the constructions referred to in this and the next preceeding paragraph are features of the present invention.

The above-described and other advantages of the present invention will be better understood from the following detailed description when considered in connection with the accompanying drawings.

DESCRIPTION OF THE PREFERRED EMBODIMENT

Figure 1:
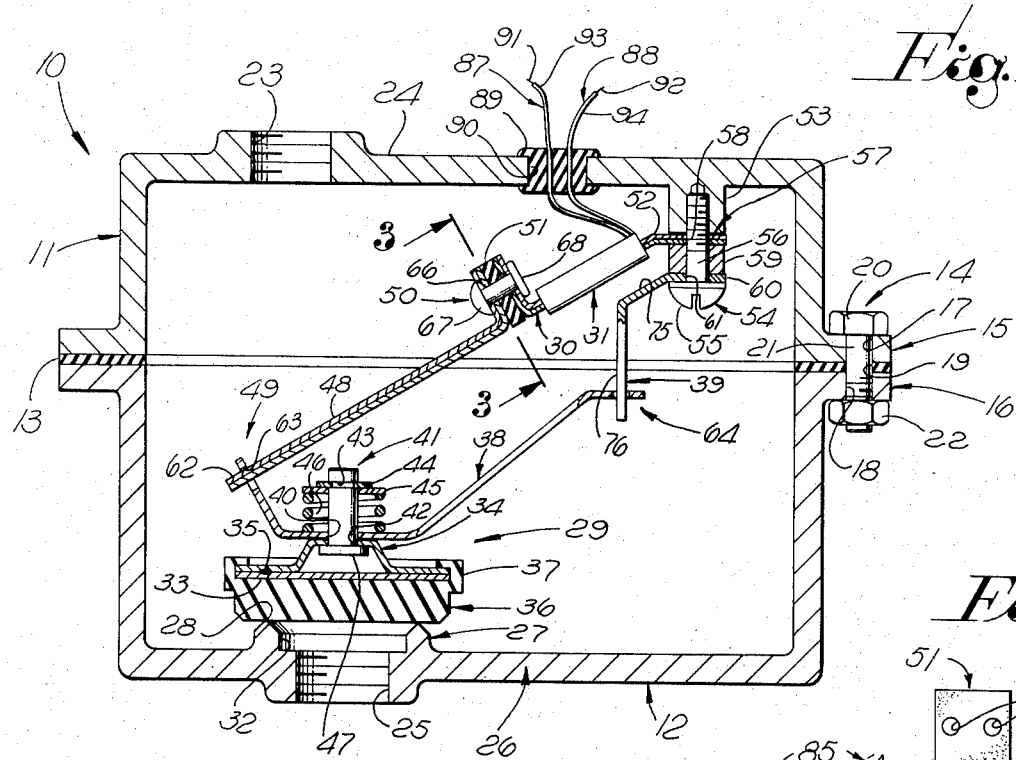
FIG. 1 is a vertical sectional view of a valve assembly constructed in accordance with the present invention.

In the drawings in FIG. 1, a valve assembly is indicated at 10 having upper and lower housing portions 11 and 12 with a fluid sealing gasket 13 clamped therebetween by preferably three or more bolts 14, only one bolt 14 being shown in FIG. 1. The bolt 14 shown will thus be the only bolt described.

Housing portions 11 and 12 may or may not be cylindrical if desired.

Housing portions 11 and 12 have contiguous flanges 15 and 16 respectively.

Flange 15 has a hole 17 therethrough. Flange 16 has a hole 18 therethrough. Gasket 13 has a hole 19 therethrough. Bolt 14 has a head 20, a shank 21 and a nut 22 threaded to its lower end. Bolt head 20 rests on the upper surface of flange 15. Shank 21 extends through holes 17, 19 and 18. Nut 22 is turned up tight against the lower surface of flange 16.

Assembly 10 has a threaded inlet 23 that extends through the upper wall 24 of housing portion 11. Assembly 10 has a threaded outlet 25 that extends through a lower wall 26 of housing portion 12.

Wall 26 has an upwardly extending annular projection 27 which, at its upper knife edge, provides a valve seat 28. A poppet valve 29 is shown resting on seat 28 in FIG. 1. Valve 29 can be lifted off of seat 28. This can be accomplished by heating a bimetal strip 30. An electrical resistance heater 31 including a coil of wire is wrapped around strip 30. Thus, when an electrical current is passed through the coil 31, strip 30 is heated. When valve 29 lifts off of valve seat 28, an opening is provided at 32. Natural gas can then, for example, enter inlet 23 and pass through opening 32 and through outlet 25.

Valve 29 may include metal stampings or plates 33 and 34 which can be spot-welded together at preferably three, four or more locations 35.

A rubber disc 36 has a U-shaped annular appendage 37 which may be snapped around and/or cemented to plates 33 and 34.

Valve 29 is carried by a lever 38 which is loosely hinged from a bracket 39.

Lever 38 has a hole 40 which extends therethrough. Plate 34 has a hole 42 which lies approximately in registration with lever hole 40. Stud 41 extends upwardly through holes 42 and 40. Stud 41 has a conventional snap-ring groove 43. A conventional snap ring 44 is located in groove 43. A conventional washer 45 extends around stud 41 against the lower surface of snap ring 44. An open coil spring 46 lies in compression around stud 41 between lever 38 and washer 45. Stud 41 has a flange 47 fixed to its lower end abutting the lower central surface of plate 34 near hole 42.

A bimetal strip 48 has a connection at its left end, as viewed in FIG. 1, with the left end of lever 38 as indicated at 49. Strips 30 and 48 are fixed together by two rivets 50, an insulator 51 being compressed in between strips 30 and 48.

Strip 30 has a bend 52 which is not conventional. However, the construction of the assembly including strips 30 and 48, coil 31, rivets 50, and insulator 51, is otherwise entirely conventional except for the construction of strip 48 at its left end as veiwed in FIG. 1 and to be described. The conventional portions of strips 30 and 48, and the structures connected therewith, are employed to compensate for any change in the ambient temperatures.

Upper housing portion 11 is provided with a boss 53 into which two screws 54 are threaded. Each screw 54 has a head 55, and a shank 56 which is threaded at its upper end, as viewed in FIG. 1. Strip 30 has an end portion 57 with two holes therethrough at 58. A ferrule 59 extends around the two screw shanks 56 between strip end portion 57 and an end portion 60 of bracket 39. End portion 60 of bracket 39 is provided with two holes 60 therethrough through which screw shanks 56 project.

Screws 54 may be provided with lock washers if desired; however, the lock washers are not shown. In any event, screws 54 are thightened down hard to hold end portion 57 of strip 30, ferrule 59, and end portion 60 of bracket 39 in fixed positions relative to upper housing portion 11.

As shown in FIG 1, coil 31 has electrical leads 87 and 88 which extend therefrom through a grommet 89 which may, if desired, be fixed to and sealed through a hole 90 in housing portion 11. Leads 87 and 88 may be sealed through grommet 89. Leads 87 and 88 include electrical conductors 91 and 92, respectively, and insulation at 93 and 94, respectively.

Figures 2, 7:
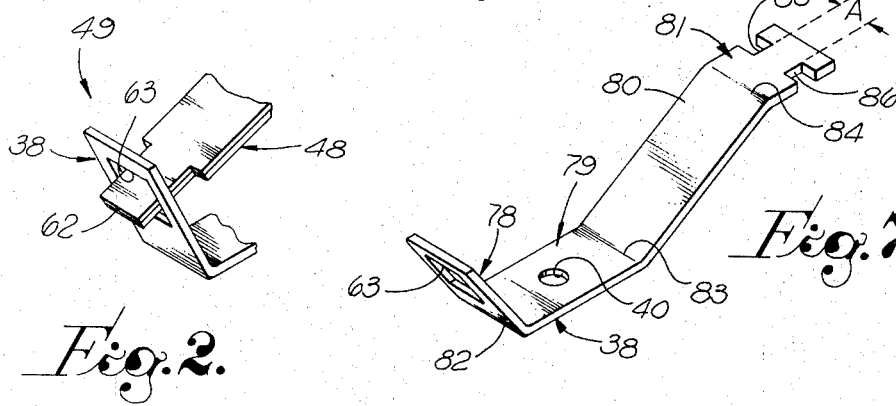
FIG. 2 is a perspective view of a portion of the assembly shown in FIG. 1.
FIG. 7 is a perspective view of a lever shown in FIG. 1.

Connection 49 is shown in FIG. 2. Strip 48 has an end portion 62 which is smaller in width than a slot 63 through lever 38. End portion 62 of strip 48 also has a thickness which is less than the width of slot 63. (See both FIG. 1 and FIG. 2.) A hinge arrangement is provided at 64 in FIG. 1 between bracket 39 and lever 38. Both the hinge arrangement 64 and the connection 49 may be a rather loose arrangements if desired. For example, the difference between the width of end portion 62 and the length of slot 63 may be substantial if desired. The same is true of the difference between the thickness of end portion 62 and the width of slot 63.

Figure 3:
FIG. 3 is a front elevational view of an insulator shown in FIG. 1.

As shown in FIG. 3, insulator 51 has holes 65 therethrough to accommodate the shanks 66 of rivets 50 shown in FIG. 1.

Figure 4:
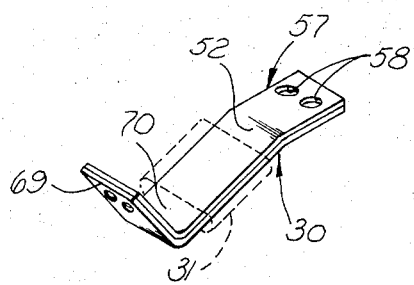
FIG. 4 is a perspective view of a bimetal strip shown in FIG. 1.

As shown in FIG. 4, strip 30 not only is provided with end portion 57 but is also provided with portions 69 and 70 integral therewith. Portion 69 is disposed at substantially a right angle relative to portion 70. Portions 57 and 70 are connected at the line of bend 52.

Figures 5, 6:
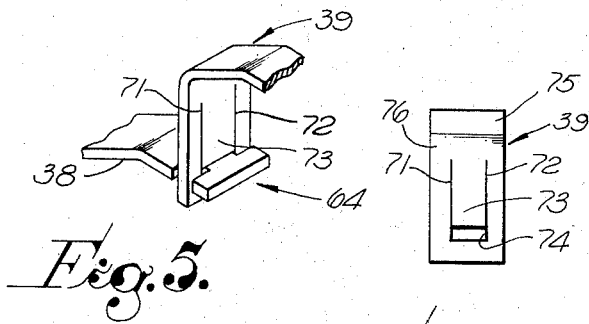
FIG. 5 is a perspective view of a portion of the assembly shown in FIG. 1.
FIG. 6 is a rear elevational view of a bracket shown in FIG. 1.

Hinge arrangement 64 is shown in FIG. 5. The bracket 39 is provided with slits at 71 and 72 to define a tab 73 which may be bent out of the plane of bracket 39 to assemble lever 38 thereto. Tab 73 may then be returned to the position shown in FIG. 5 after bracket 38 has been assembled in the position shown in FIG. 5.

Bracket 39, without the assembly of lever 38 thereto, is shown in FIG. 6. In FIG. 6, tab 73 is in the same position as shown in FIG. 5. In FIG. 6, tab 73 with a lower portion of bracket 39 forms a slot 74 which extends completely through bracket 39. Lever 38 is thus assembled in slot 74 to the position shown in FIG. 5. Bracket 39 has portions 75 and 76 integral with portion 60, portion 60 not being visible in the view of FIG. 6. (See FIG. 1.)

As shown in FIG. 7, lever 38 has integral portions 78, 79, 80, and 81. All the portions of lever 38 are flat. Lever 38 is bent at 82, 83 and 84. Slot 63 is located through portion 78. Hole 40 is located through portion 79. Portion 81 has notches at 85 and 86.

The dimension at "A" may be substantially less than the length of slot 74 shown in FIG. 6 if desired. The width of lever 38 may be substantially larger than the length of slot 74 if desired. The thickness of lever 38 may be substantially less than the width of the slot 74 if desired. At any rate, in assembly, as shown in FIG. 5, lever 38 is locked to bracket 39 but is easily movable relative thereto. Arrangement 64 thus acts as a loose hinge.

The phrase "means to hinge" is hereby defined for use herein and in the claims as something like a door-type hinge. The definition of this paragraph, therefore, hereby excludes a spring biased-type hinge including, but not limited to, a leaf spring hinge.

What is claimed is:

1. A valve assembly comprising: a housing defining a chamber, said housing having an opening therethrough into said chamber; a valve seat fixed relative to said housing and extending around said opening; a valve movable relative to said housing in first and second predetermined directions respectively into and out of engagement with said seat to seal off said opening and to allow fluid to flow therethrough, respectively, said housing having inlet and outlet ports extending therethrough, one of said ports being in communication with said chamber at a position spaced from said opening, the other of said ports being in communication with said chamber through said opening when said valve lies out of engagement with said seat; a member movably connected from said housing; first means mounting said valve from said member; second means connected from said housing actuable to move said member and said valve in at least one of said predetermined directions, said member including a lever, said lever being made of strip material having oppositely disposed notches at one end thereof separated by a narrow portion of said lever being positioned through and loosely movable in all directions, a strip fixed relative to said housing having a transverse rectangular slot through the thickness thereof, said narrow portion of said lever being positioned through and loosely movable in all directions through said strip slot, the width of the portions of said lever on each side of said strip being greater than the width of said strip slot, said lever being locked in and hinged to said strip at the position of said strip slot, said lever having an approximately fixed hinge axis, said valve seat lying generally in a single plane, said lever hinge axis being approximately parallel to the said plane of said valve seat, said lever having a flat portion intermediate its ends which is parallel to said valve seat plane when said valve is in engagement with said seat, said flat portion having a hole therethrough, a stud having one end fixed to said valve, said stud extending through and being slidable relatively to said lever through said hole, said valve being positioned between one surface of said lever flat portion and said valve seat, flange means mounted on the other end of said stud, an open coil helical spring mounted around said stud between said flange means and the flat portion surface of said lever opposite said one surface thereof, the other end of said lever having a slot therethrough the length of which extends in a direction approximately parallel to said valve seat plane, said second means including a heat motor actuator having a heater winding coiled around an elongate bimetal member means with one strip-like end portion extending through said lever slot, said bimetal member means one end portion being thinner than said lever slot width and having a width less than said slot length, the other end portion of said bimetal member means being fixed relative to said housing, said one port being said inlet port, said valve lying in engagement with said valve seat when no electric current flows in said winding.

* * * * *